UNITED STATES PATENT OFFICE.

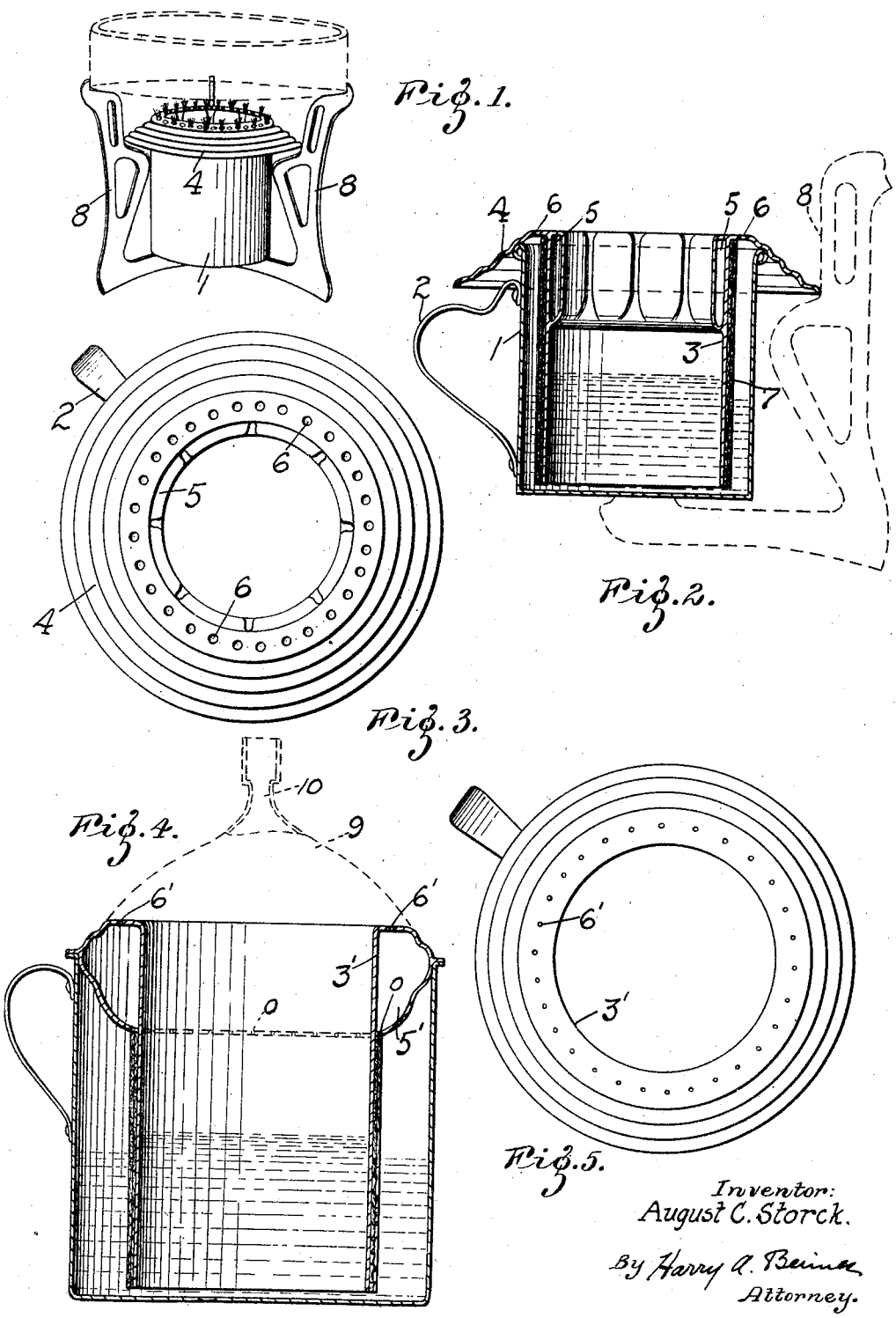

AUGUST C. STORCK, OF ST. LOUIS, MISSOURI.

LIQUID-FUEL BURNER.

1,391,022.   Specification of Letters Patent.   Patented Sept. 20, 1921.

Application filed January 27, 1921. Serial No. 440,411.

*To all whom it may concern:*

Be it known that I, AUGUST C. STORCK, a citizen of the United States, residing at St. Louis, State of Missouri, have invented certain new and useful Improvements in Liquid-Fuel Burners, of which the following is a full, clear, and exact description, reference being had to the accompanying drawings, forming a part hereof.

The present invention is directed to improvements in liquid-fuel burners, and particularly burners of the spirit or alcohol type on the order of that disclosed in my copending application Serial No. 397029, filed July 17, 1920. The object of the invention is to provide a simple alcohol lamp composed of two parts that may be readily assembled, or taken apart for purposes of cleaning; one that embodies means for heating the fuel vapor so as to make it more readily combustible; one that is light and adapted for general domestic purposes such as the heating of flat irons, the boiling of water, milk, and for cooking in general, and one possessing further and other advantages better apparent from the following detailed description of the invention in connection with the accompanying drawings in which—

Figure 1 is a perspective view of my improved burner positioned on a stand and applied to the heating of the contents of a receptacle; Fig. 2 is a middle vertical longitudinal section through the burner, part of the stand being shown dotted; Fig. 3 is a top plan of the burner; Fig. 4 is a middle vertical longitudinal section through a modified form of burner and showing also the flame extinguisher dotted; Fig. 5 is a top plan of the modified form of burner.

Referring to the drawings, 1 represents a suitable vessel or container with an open top and provided with a handle 2. A central tubular member or shell 3 is disposed within the container 1, the shell 3 being open at the top and the bottom and provided adjacent its upper edge with an annular flange 4, the flange 4 resting upon the upper beaded edge of the container 1 when the container 1 and shell 3 are assembled. When thus assembled the shell 3 is spaced a slight distance from the bottom of the container 1, thus permitting the liquid that is placed within the shell to also enter the space between said shell and the container. The shell 3 is provided near its upper edge with a series of interiorly disposed pockets or heating chambers 5, which become highly heated when the fuel within the shell is ignited and thus tend to raise the temperature of the fuel vapors, making the same more readily combustible. Snugly encompassing the shell 3 and confined between said shell and a row of burner openings 6 above the space surrounding the shell, is a porous sleeve 7 of asbestos, cotton, or any wick-like material adapted to absorb the alcohol or other material to be burned and cause the same to permeate the wick by capillary action as well understood in the art. The surface of the liquid within the space surrounding the shell will obviously be at a lower level than that within the shell, the vapors accumulating in the space above the liquid and escaping through the burner openings 6, where they are readily ignitable, and burn with a hot blue flame. Considerable heat will accumulate within the chambers 5, which heat will rapidly vaporize the liquid permeating the sleeve 7, thus accelerating the capillary action through the wick. It will thus be apparent that there will always be an abundant supply of combustible vapors within the space around the shell and a certain amount of pressure will be generated within this space due to vaporization.

When in service the burner may be set in a tripod or equivalent stand, and when so disposed the flange 4 of the burner will bear against the legs 8 of the stand with sufficient pressure to bind the burner and stand together so that they may be handled as a compact unit.

In Figs. 4 and 5 I have shown a modified form of burner wherein the heating chamber 5' is disposed on the outside of the shell 3', the burner openings 6' communicating with the chamber 5' and the combustible vapors entering the heating chamber through a series of openings *o*. In Fig. 4 a bell-shaped extinguisher 9 is shown dotted as applied to the burner, the extinguisher being provided with a vent opening 10 to permit the escape of hot gases. Obviously the alcohol to be burned is poured into the inner compartment form by the shell 3, after which it finds its way into the space around said shell, and thus permeates the wick 7. The details of the burner may be considerably changed without a departure from the nature or spirit of the invention.

Having described my invention, I claim:
1. A liquid-fuel burner comprising an open top container, a central tubular member spaced from the wall of the container and open at the top, said central member being provided with an annular flange disposed over the container, the central member being further provided with heating chambers arranged on the inside thereof, and a series of burner openings disposed above the space between said member and container, and a tubular wick wrapped about the central member.

2. A liquid-fuel burner comprising an open top container, a central tubular member spaced from the wall of the container thereby providing a gas chamber, and having a flange extending over and closing said chamber at the top, the central member being further provided with heating chambers near the top thereof and a series of burner openings in said flange.

In testimony whereof I affix my signature.

AUGUST C. STORCK.